US010642666B2

(12) United States Patent
Cheng et al.

(10) Patent No.: US 10,642,666 B2
(45) Date of Patent: May 5, 2020

(54) GATEWAY, INTERNET OF THINGS DEVICE CONTROL SYSTEM AND METHOD THEREOF

(71) Applicants: Tatung Company, Taipei (TW); TATUNG UNIVERSITY, Taipei (TW)

(72) Inventors: Fu-Chiung Cheng, Taipei (TW); Chun-Wei Tseng, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 72 days.

(21) Appl. No.: 15/721,749

(22) Filed: Sep. 30, 2017

(65) Prior Publication Data

US 2019/0065288 A1 Feb. 28, 2019

(30) Foreign Application Priority Data

Aug. 28, 2017 (TW) .............................. 106129209 A (51) Int. Cl.
| | | |
|---|---|---|
| *G06F 9/54* | (2006.01) | |
| *H04W 88/16* | (2009.01) | |
| *H04L 29/08* | (2006.01) | |
| *H04W 88/08* | (2009.01) | |

(52) U.S. Cl.
CPC .............. *G06F 9/542* (2013.01); *G06F 9/543* (2013.01); *H04L 67/1031* (2013.01); *H04L 67/125* (2013.01); *H04W 88/08* (2013.01); *H04W 88/16* (2013.01)

(58) Field of Classification Search
CPC ...................................................... G06F 9/542
USPC ....................................................... 719/318
See application file for complete search history.

(56) References Cited

U.S. PATENT DOCUMENTS

| | | | | |
|---|---|---|---|---|
| 9,652,976 | B2 * | 5/2017 | Bruck | ...................... F24F 11/30 |
| 9,933,177 | B2 * | 4/2018 | Hester | ..................... G05B 15/02 |
| 10,142,122 | B1 * | 11/2018 | Hill | ...................... H04L 12/2807 |
| 2017/0093593 | A1 * | 3/2017 | Yang | ................... H04L 12/2816 |

FOREIGN PATENT DOCUMENTS

| | | |
|---|---|---|
| CN | 103001840 | 3/2013 |
| CN | 103149958 | 6/2013 |
| CN | 104142661 | 11/2014 |
| CN | 104865834 | 8/2015 |
| CN | 105163089 | 12/2015 |
| WO | 2016113162 | 7/2016 |

OTHER PUBLICATIONS

"Office Action of Taiwan Counterpart Application," dated Aug. 7, 2018, pp. 1-8.

* cited by examiner

*Primary Examiner* — Andy Ho
(74) *Attorney, Agent, or Firm* — JCIPRNET (57) ABSTRACT

A gateway, an Internet of Things (IoT) device control system and a method thereof are provided. The method includes: receiving an event message; obtaining a first fact record corresponding to the event message according to the event message; inferring an intention corresponding to a user according to the first fact record; determining a service to be provided to the user according to the intention corresponding to the user; and outputting an output message to a first IoT device according to the determined service such that the first IoT device provides the service according to the output message.

30 Claims, 8 Drawing Sheets

GATEWAY, INTERNET OF THINGS DEVICE CONTROL SYSTEM AND METHOD THEREOF

CROSS-REFERENCE TO RELATED APPLICATION

This application claims the priority benefits of Taiwan application serial no. 106129209, filed on Aug. 28, 2017. The entirety of the above-mentioned patent application is hereby incorporated by reference herein and made a part of this specification.

BACKGROUND OF THE INVENTION

1. Field of the Invention

The invention relates to a gateway, an Internet of Things (IoT) device control system and a method thereof.

2. Description of Related Art

In the scenario where many IoT devices are deployed to different locations, how to effectively manage the IoT devices is the most important thing. In general, for the common products currently on the market, the IoT devices are managed by setting conditions for one IoT device, and another IoT device is driven only when the set conditions are met. However, given that the conditions are independently set for each of the IoT devices, when one IoT device is replaced by another IoT device, the conditions originally set for the replaced IoT device will be completely disabled, and it is also required to reset the conditions for the new IoT device.

Moreover, in the current IoT environment, all the IoT devices still rely on manual settings by individual. Although the IoT devices may achieve specific actions through standard settings, the conventional method not only fails to make the IoT devices perform appropriate actions in response to various conditions, but also fails to fit in the IoT environment which generates new data all the time.

SUMMARY OF THE INVENTION

The invention provides a gateway, an IoT device control system and an IoT device control method. With the invention, the user may no longer need to understand how the gateway and the IoT devices are connected and communicated since the gateway can automatically determine the intention of the user and control the corresponding IoT device to provide the corresponding service. As a result, a use experience of the user may be effectively improved when using the IoT device.

The invention proposes a gateway. The gateway includes a communication circuit, a memory circuit and a processor. The communication circuit is configured to directly or wirelessly connect with an Internet of Things (IoT) device. The memory circuit is configured to store a plurality of modules. The processor is coupled to the communication circuit and the memory circuit, and configured to control operations of the communication circuit and access the memory circuit for executing the modules. The modules include an event message receiving module, a fact record obtaining module, an intention inferring module, a service determination module and an output module. The event message receiving module receives an event message. The fact record obtaining module obtains a first fact record corresponding to the event message according to the event message. The intention inferring module infers an intention corresponding to a user according to the first fact record. The service determination module determines a service to be provided to the user according to the intention corresponding to the user. The output module outputs an output message to a first IoT device in the at least one IoT device according to the determined service such that the first IoT device provides the service according to the output message.

The invention proposes an IoT device control system, and such system includes at least one IoT device and a gateway. The gateway receives an event message from outside the gateway. The gateway obtains a first fact record corresponding to the event message according to the event message. The gateway infers an intention corresponding to a user according to the first fact record. The gateway determines a service to be provided to the user according to the intention corresponding to the user. The gateway outputs an output message to a first IoT device in the at least one IoT device according to the determined service such that the first IoT device provides the service according to the output message.

The invention proposes an IoT device control method. The method includes: receiving an event message; obtaining a first fact record corresponding to the event message according to the event message; inferring an intention corresponding to a user according to the first fact record; determining a service to be provided to the user according to the intention corresponding to the user; and outputting an output message to a first IoT device in at least one IoT device according to the service such that the first IoT device provides the service according to the output message.

Based on the above, the invention proposes a gateway, an IoT device control system and an IoT device control method. The gateway of the invention can receive the event message from outside the gateway, and obtain the corresponding fact record according to the event message. According to the fact record, the gateway can infer the intention of the user. According to the inferred intention of the user, the service to be provided to the user may be determined. Lastly, according to the determined service, the corresponding IoT device is controlled to provide the service. In this way, the user does not have to understand how the gateway and the IoT devices are connected and communicated since the gateway can automatically determine the intention of the user and control the corresponding IoT device to provide the corresponding service. As a result, a use experience of the user may be effectively improved when using the IoT device.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Descriptions of the invention are given with reference to the exemplary embodiments illustrated with accompanied drawings, in which same or similar parts are denoted with same reference numerals. In addition, whenever possible, identical or similar reference numbers stand for identical or similar elements in the figures and the embodiments.

Figure 1:
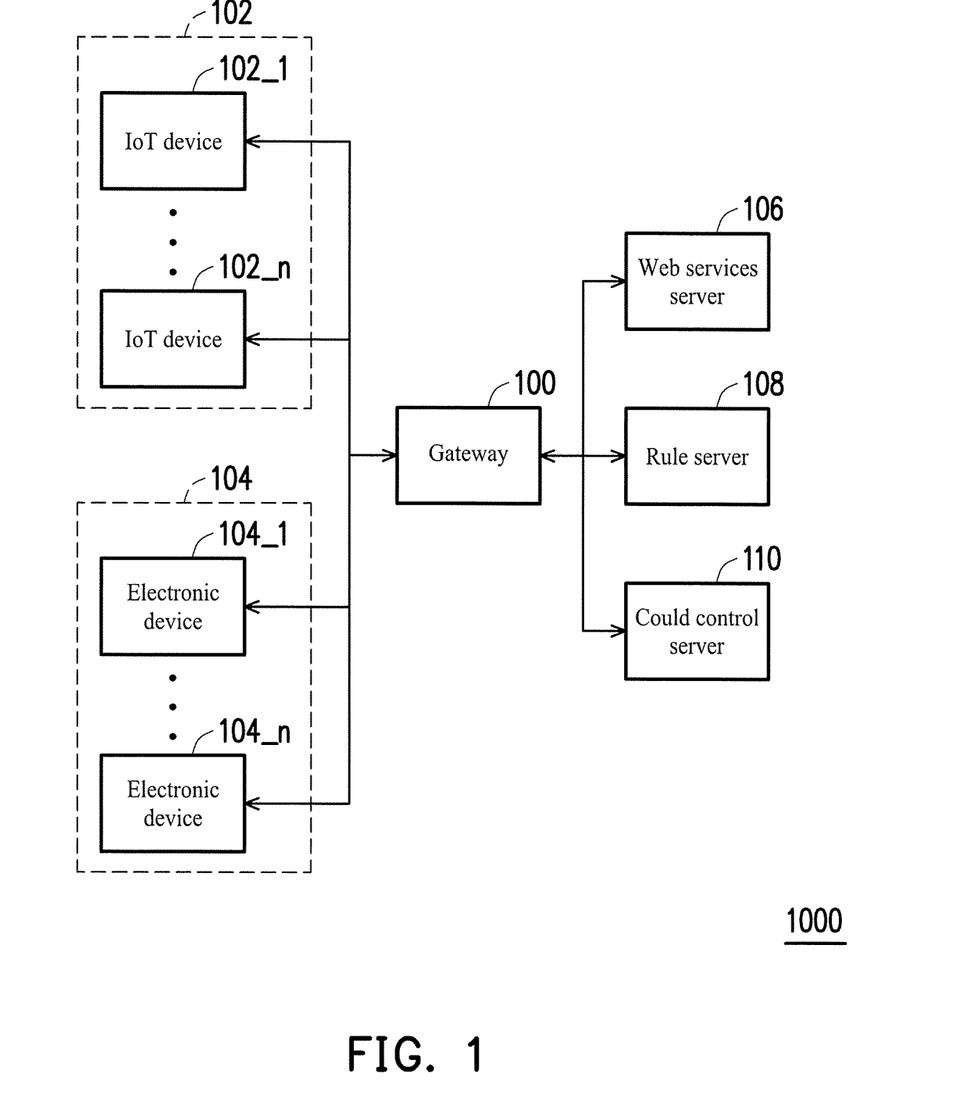
FIG. 1 is a schematic diagram illustrating an IoT device control system according to an embodiment of the invention.

FIG. 1 is a schematic diagram illustrating an IoT device control system according to an embodiment of the invention.

With reference to FIG. 1, in the present exemplary embodiment, an IoT device control system 1000 includes a gateway 100, an IoT device 102, an electronic device 104, a web services server 106, a rule server 108 and a could control server 110. Among them, the IoT device 102 may include IoT devices 102_1 to 102_n, and the electronic device 104 may include electronic devices 104_1 to 104_n. Each of the IoT devices 102_1 to 102_n, the electronic devices 104_1 to 104_n, the web services server 106, the rule server 108 and the cloud control server 110 can communicate with the gateway 100 through wired or wireless networks. In particular, the invention is not intended to limit the quantities of the IoT device, the electronic device, the gateway and various servers in the IoT device control system 1000.

Figure 2A:
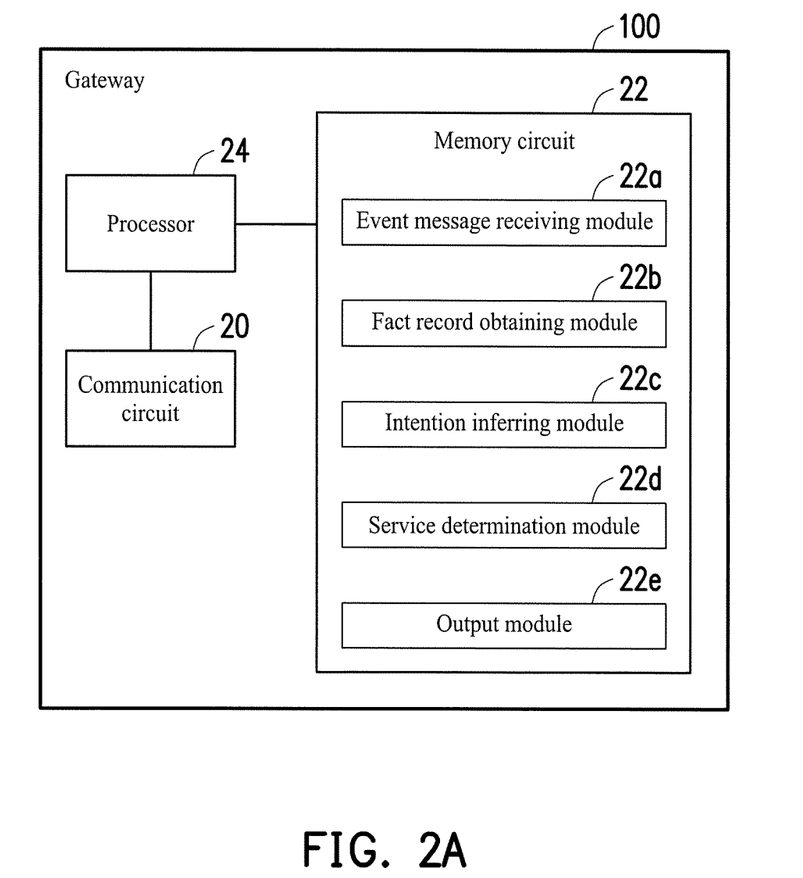
FIG. 2A is a schematic diagram illustrating a gateway according to an embodiment of the invention.

FIG. 2A is a schematic diagram illustrating a gateway according to an embodiment of the invention.

With reference to FIG. 2A, the gateway 100 includes a communication circuit 20, a memory circuit 22 and a processor 24. Among them, each of the communication circuit 20 and the memory circuit 22 is coupled to the processor 24.

The communication circuit 20 may be a signal transmission element that supports wireless communication such as GSM (global system for mobile communication), PHS (personal handy-phone system), a CDMA (code division multiple access) system, a WCDMA (wideband code division multiple access) system, a LTE (long term evolution) system, a WiMAX (worldwide interoperability for microwave access) system a Wi-Fi (wireless fidelity) system or Bluetooth or wired communication such as Ethernet, ASDL, optical networks.

The memory circuit 22 may be a fixed or a movable device in any possible forms including a random access memory (RAM), a read-only memory (ROM), a flash memory or other similar devices or a combination of the above-mentioned devices.

The processor 24 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements.

In the present embodiment, the memory circuit 22 of the gateway 100 is stored with a plurality of code segments. The code segments may be executed by the processor 24 after being installed. For example, the memory circuit 22 at least includes an event message receiving module 22a, a fact record obtaining module 22b, an intention inferring module 22c, a service determination module 22d and an output module 22e. Operations of the gateway 100 applied in the IoT device control system 1000 are respectively executed by those modules, where each of the modules is composed of one or more code segments. However, the invention is not limited to the above. Each operation of the gateway 100 may also be implemented in other hardware manners. In addition, in another embodiment of the invention, the memory circuit 22 may further include other modules with different functions. It should be noted that, the gateway 100 may include an expert system composed of multiple modules. The expert system may include the event message receiving module 22a, the fact record obtaining module 22b, the intention inferring module 22c, the service determination module 22d and the output module 22e mentioned above.

Figure 2B:
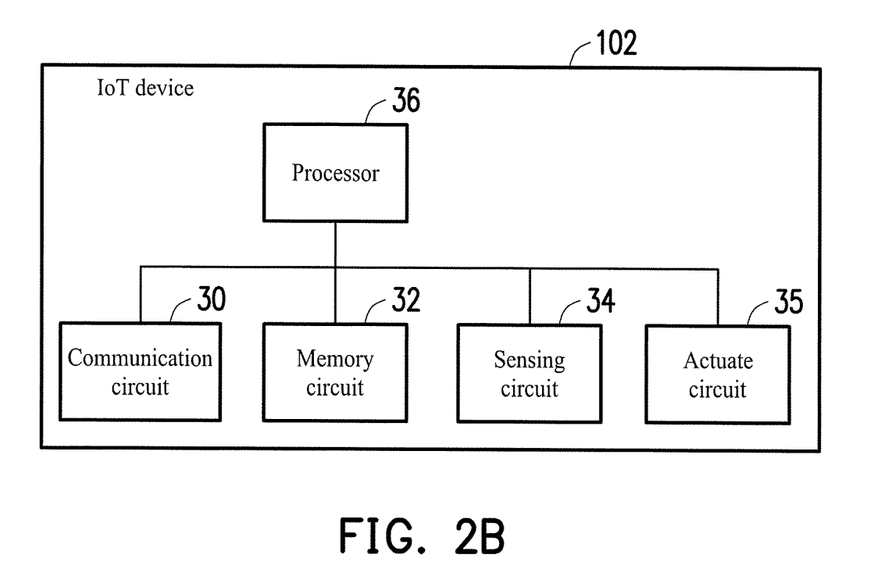
FIG. 2B is a schematic diagram illustrating an IoT device according to an embodiment of the invention.

FIG. 2B is a schematic diagram illustrating an IoT device according to an embodiment of the invention. Because the IoT devices 102_1 to 102_n can substantially include similar elements, only the IoT device 102 is described herein as an example.

With reference to FIG. 2B, the IoT device 102 includes a communication circuit 30, a memory circuit 32, a sensing circuit 34, an actuate circuit 35 and a processor 36. Among them, each of the communication circuit 30, the memory circuit 32, the sensing circuit 34 and the actuate circuit 35 is coupled to the processor 36. The communication circuit 30, the memory circuit 32 and the processor 36 are elements respectively similar to the communication circuit 20, the memory circuit 22 and the processor 24, which are not repeated hereinafter. The sensing circuit 34 may be any device capable of sensing information of an external environment, such as a temperature sensor, a humidity sensor, an optical sensor or an image capturing device, which are not particularly limited herein. The actuate circuit 34 may be a circuit that activates the IoT device 102 for executing a specific function, such as a motor or a switch with the related function, which are not particularly limited herein.

In terms of IoT application, the IoT device 102 may be implemented by a common electronic equipment. For instance, the IoT device 102 may be an air conditioning equipment, a refrigerator, a vehicle or a cell phone, but the invention is not limited to the above examples.

In the present exemplary embodiment, the memory circuit 32 of the IoT device 102 is stored with a plurality of code segments. The code segments may be executed by the processor 36 after being installed. For example, the memory circuit 32 is stored with a plurality of modules. Operations of the IoT device 102 applied in the IoT device control system 1000 are respectively executed by those modules, where each of the modules is composed of one or more code segments. However, the invention is not limited to the above. Each operation of the IoT device 102 may also be implemented in other hardware manners.

Figure 2C:
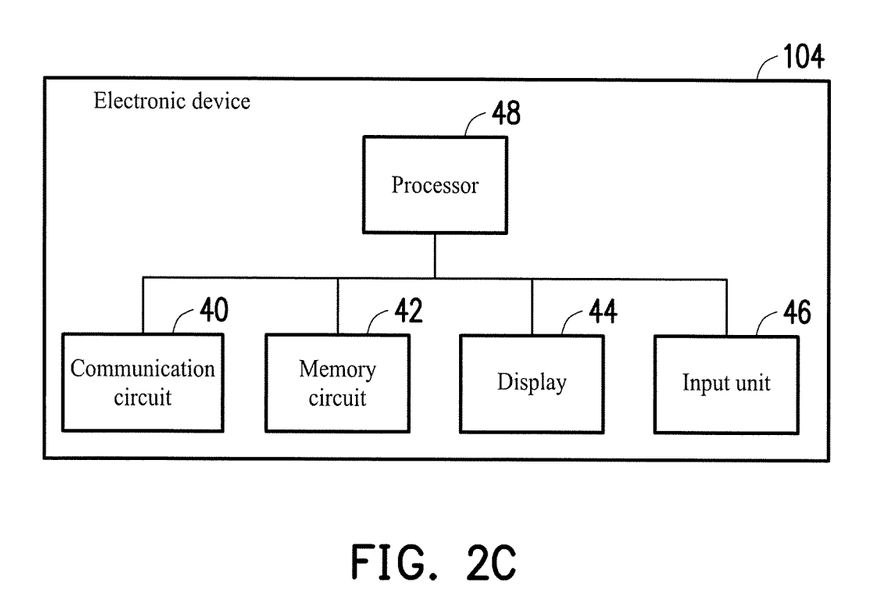
FIG. 2C is a schematic diagram illustrating an electronic device according to an embodiment of the invention.

FIG. 2C is a schematic diagram illustrating an electronic device according to an embodiment of the invention. Because the electronic devices 104_1 to 104_n can substantially include similar elements, only the electronic device 104 is described herein as an example.

With reference to FIG. 2C, the electronic device 104 includes a communication circuit 40, a memory circuit 42, a display 44, an input unit 46 and a processor 48. Among them, each of the communication circuit 40, the memory circuit 42, the display 44 and the input unit 46 is coupled to the processor 48. The communication circuit 40, the memory circuit 42 and the processor 48 are elements respectively similar to the communication circuit 20, the memory circuit 22 and the processor 24, which are not repeated hereinafter. The electronic device 104 is, for example, an electronic portable device, such as a cell phone, a tablet computer or a notebook computer, which are not particularly limited herein.

The display 44 may be a display device capable of providing a display function within in a display area of the electronic device 104. The display 44 may be a display device for providing a display function, such as a LCD (liquid crystal display), a LED (light-emitting diode) display or a FED (field emission display) display.

The input unit 46 may be an input tool, such as a microphone, a touch pad, a stylus, a mouse or a keyboard.

In the present exemplary embodiment, the memory circuit 42 of the electronic device 104 is stored with a plurality of code segments. The code segments may be executed by the processor 48 after being installed. For example, the memory circuit 42 is stored with a plurality of modules. Operations of the electronic device 104 applied in the IoT device control system 1000 are respectively executed by those modules, where each of the modules is composed of one or more code segments. However, the invention is not limited to the above. Each operation of the electronic device 104 may also be implemented in other hardware manners.

Figure 2D:
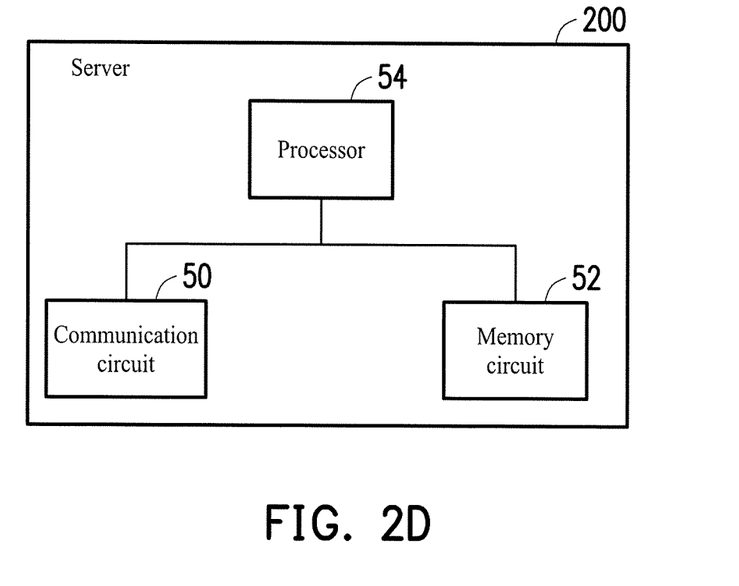
FIG. 2D is a schematic diagram illustrating a server according to an embodiment of the invention.

FIG. 2D is a schematic diagram illustrating a server according to an embodiment of the invention. Because the web services server 106, the rule server 108 and the cloud control server 110 can substantially include similar elements, only a server 200 is described herein as an example.

With reference to FIG. 2D, the server 200 includes a communication circuit 50, a memory circuit 52 and a processor 56. Among them, each of the communication circuit 50 and the memory circuit 52 is coupled to the processor 54. The communication circuit 50, the memory circuit 52 and the processor 54 are elements respectively similar to the communication circuit 20, the memory circuit 22 and the processor 24, which are not repeated hereinafter.

In the present exemplary embodiment, the memory circuit 52 of the server 200 is stored with a plurality of code segments. The code segments may be executed by the processor 54 after being installed. For example, the memory circuit 52 is stored with a plurality of modules. Operations of the server 200 applied in the IoT device control system 1000 are respectively executed by those modules, where each of the modules is composed of one or more code segments. However, the invention is not limited to the above. Each operation of the server 200 may also be implemented in other hardware manners.

Figure 3:
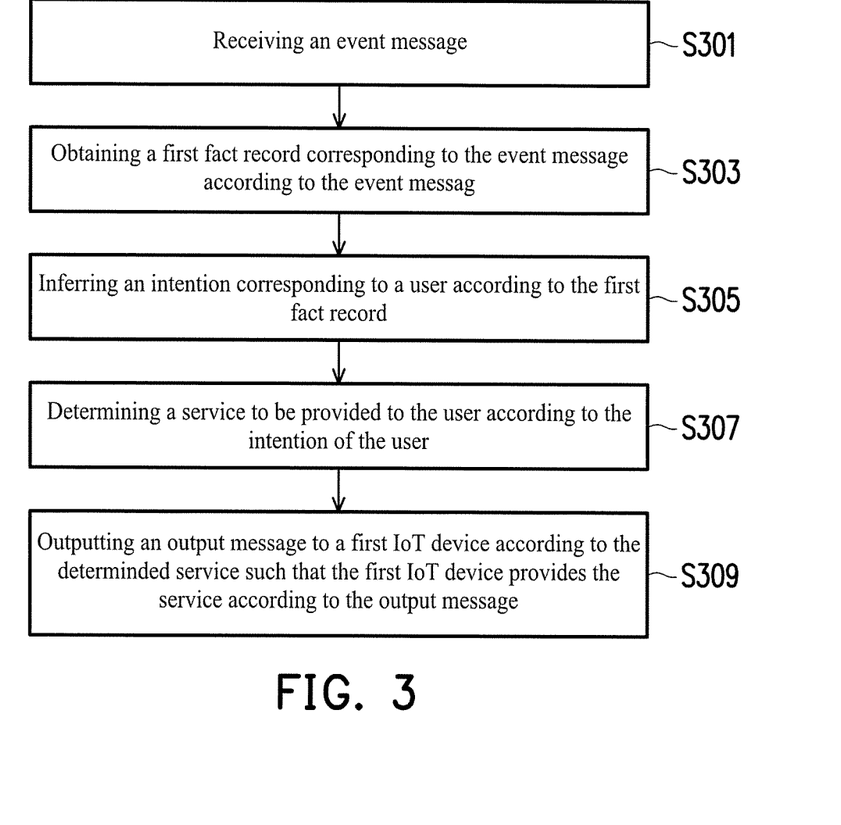
FIG. 3 is a flowchart illustrating an IoT device control method according to an embodiment of the invention.

FIG. 3 is a flowchart illustrating an IoT device control method according to an embodiment of the invention.

Referring to FIG. 3 and FIG. 1 together, the event message receiving module 22a of the gateway 100 can receive an event message from outside the gateway 100 (step S301). The event message is, for example, an event message sent by the IoT device 102_1 (a.k.a. a second IoT device) in the IoT device 102. The event message is, for example, obtained by sensing the external environment by the IoT device 102_1. In the case of a smart home, the IoT device 102_1 may be a temperature sensing device deployed in a living room. When a variation on temperature is being detected, the IoT device 102_1 can transmit an event message corresponding to the variation to the gateway 100. In this example, the event message may include, for example, a current temperature detected by the temperature sensing device.

Nonetheless, in another embodiment, the event message may also be sent by the web services server 106. For example, the web services server 106 can provide information that user are interested in, such as weather information (e.g., temperature) or a traffic condition. When the weather information or the traffic condition changes, the web services server 106 may also actively provide the event message to the gateway 100. In this example, the event message is, for example, the weather information or the traffic condition.

Subsequently, when said event message is received by the event message receiving module 22a of the gateway 100, the fact record obtaining module 22b of the gateway 100 can obtain a fact record (a.k.a. a first fact record) corresponding to the event message according to the event message (step S303). For instance, in continuation with the example of the smart home, after the IoT device 102_1 detects the variation on a living room temperature and transmits the event message to the gateway 100, the fact record obtaining module 22b of the gateway 100 can obtain the fact record (a.k.a. the first fact record) corresponding to the event message according to the event message. Here, the fact record is, for example, the current temperature detected by the IoT device 102_1. Particularly, in another exemplary embodiment, the fact record obtaining module 22b may also obtain the first fact record according to the event message transmitted by the IoT device 102_1 and a fact record (a.k.a. a second fact record) pre-stored in the gateway 100. The second fact record is, for example, information regarding the IoT device 102_1 disposed in the living room. Meanwhile, the event message receiving module 22a of the gateway 100 can know that the obtained event message is the living room temperature according to the event message and the second fact record. In another exemplary embodiment, the fact record obtaining module 22b can also obtain the first fact record according to the event message transmitted by the IoT device 102_1, the second fact record, additional information obtained from an electronic device (a.k.a. a first electronic device). For example, the gateway 100 can know that the obtained event message is the living room temperature according to the event message and the second fact record. Also, when the electronic device of the user in living room is connected to the gateway 100, the gateway 100 can know a current number of people in the living room based on an information transmission between the electronic devices and the gateway or a number of connections. In this way, the gateway 100 can then obtain the first fact record including the living room temperature and the number of people in the living room. Nonetheless, the invention is not intended to limit the manner that the gateway 100 knows the current number of people in the living room. In another embodiment, the gateway 100 can also know that the user is in the living room through a WiFi positioning method.

After the first fact record is obtained, the intention inferring module 22c of the gateway 100 can infer an intention corresponding to a user according to the first fact record (step S305). In continuation with the example of the smart home, when the gateway 100 determines that the number of people in the living room is not zero and the living room temperature is as high as 30° C., the gateway 100 can then determine that such temperature is not an apparent temperature suitable for human body in general. Accordingly, it can be inferred that the intention of the user in the living room is to lower the temperature. In particular, the gateway 100 can carry out the above inference according to the first fact record and a knowledge base in the gateway 100. In an exemplary embodiment, information in the knowledge base may come from the rule server 108. The rule server 108 can, for example, provide information regarding the apparent temperature suitable for human body to the knowledge base in the gateway 100. In another exemplary embodiment, the information stored in the knowledge base may also be generated according to preference info nation of the user and a machine learning algorithm. For instance, the user usually operates the IoT device by using an electronic device (a.k.a. a second electronic device) of the user's own. The electronic device can generate the preference information by recording preferences of the user when operating the IoT device. For example, if the user normally sets an air-conditioner to 26° C., the electronic device can record such temperature into the preference information. Noted that different users may have different preference information. When there are many electronic devices of the users connected to the gateway 100, the gateway 100 can obtain the preference information from those electronic devices. Then, the obtained preference information may be inputted to the machine learning algorithm so a content in the knowledge base may be updated according to an output result. For example, based on the preference information from each of the users in the living room, the gateway 100 can decide a suitable temperature for the users through the machine learning algorithm and update the knowledge base accordingly. When the living room temperature is higher than the temperature decided according to the machine learning algorithm, the gateway 100 can determine that such temperature is not the apparent temperature suitable for human body in general. Accordingly, it can be inferred that the intention of the user in the living room is to lower the temperature.

Nevertheless, in another embodiment, the user may also send commands regarding the intention (e.g., lowering the temperature) corresponding to the user to the gateway 100 by using an electronic device (a.k.a. a third electronic device). The intention inferring module 22c of the gateway 100 can also know that the intention of the user is to lower the temperature according to the commands sent by the user.

After the intention of the user is inferred or obtained, the service determination module 22d of the gateway 100 can determine a service to be provided to the user according to the intention of the user (step S307). For example, when the intention of the user in the living room is to lower the temperature, the gateway 100 can determine to provide the service related to lowering the temperature to the user. The gateway 100 can search for the IoT device capable of providing the corresponding service that matches such intention. Said IoT device may be an air conditioning equipment or an electric fan in the living room.

Afterwards, the output module 22e of the gateway 100 can output at least one output message to a corresponding IoT device (a.k.a. a first IoT device) according to the determined service such that the first IoT device provides the corresponding service according to the output message (step S309). For example, when the intention of the user in the living room is to lower the temperature and the air conditioning equipment or the electric fan in the living room is located by the gateway 100, the gateway 100 can output the at least one output message (e.g., a control signal) to the air conditioning equipment or the electric fan in the living room. The air conditioning equipment or the electric fan in the living room can provide the service of lowering the temperature by executing a corresponding operation according to the output message.

Based on the above, in the example of the smart home, with the IoT device control method of the invention, the user does not have to voluntarily control the IoT device nor set up the IoT in advance. The gateway 100 can know whether or not the current temperature is suitable for the user according to the preference information together with the temperature sensing device disposed in the living room. When the temperature is overly high to be suitable for the user, the gateway 100 can automatically search for the equipment capable of providing the service of lowering the temperature and automatically activate the corresponding IoT device. Accordingly, the user does not have to understand how the gateway 100 and the IoT devices are connected and communicated, but simply experience the convenience of things brought by the Internet of things.

Figure 4:
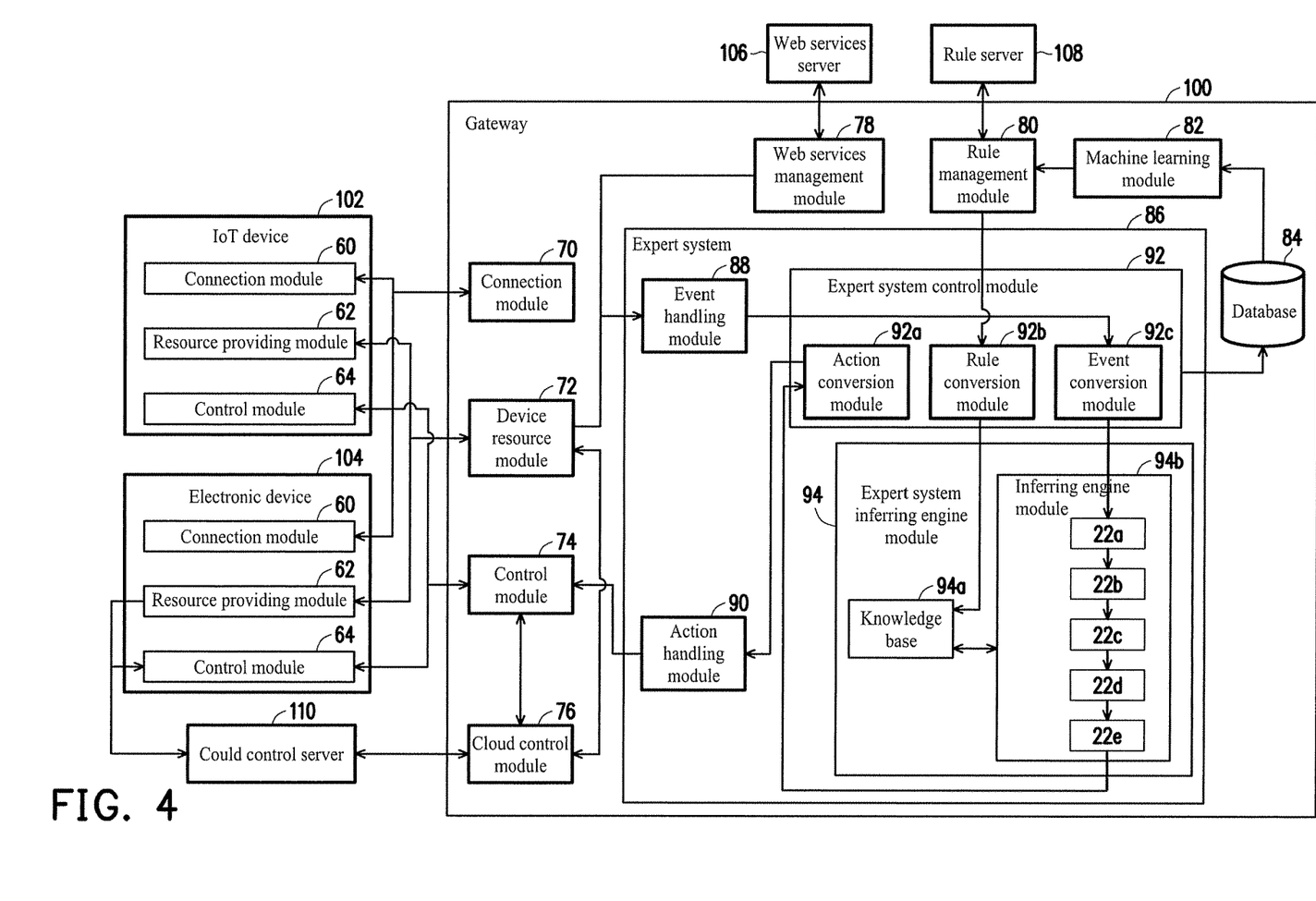
FIG. 4 is a schematic diagram illustrating detailed structure of an IoT device control system according to an embodiment of the invention.

FIG. 4 is a schematic diagram illustrating detailed structure of an IoT device control system according to an embodiment of the invention.

With reference to FIG. 4, in the present exemplary embodiment, each of the IoT device 102 and the electronic device 104 may include a connection module 60, a resource providing module 62 and a control module 64. In the present exemplary embodiment, the connection module 60, the resource providing module 62 and the control module 64 are implemented by using program codes. Nonetheless, in another exemplary embodiment, each of the aforementioned modules may also be separately implemented in a hardware manner.

The gateway 100 includes a connection module 70, a device resource module 72, a control module 74, a cloud control module 76, a web services management module 78, a rule management module 80, a machine learning module 82, a database 84 and an expert system 86. In the present exemplary embodiment, the connection module 70, the device resource module 72, the control module 74, the cloud control module 76, the web services management module 78, the rule management module 80, the machine learning module 82, and the expert system 86 are modules implemented by, for example, using program codes and capable of executing corresponding functions. Nonetheless, in another exemplary embodiment, each of the aforementioned modules and the expert system 86 may also be separately implemented in a hardware manner. The database 84 is, for example, an area in the memory circuit 22 for storing a group of related data, or a fixed or a movable device externally connected to the gateway 100 in any possible forms including a random access memory (RAM), a read-only memory (ROM), a flash memory or other similar devices or a combination of the above-mentioned devices.

The expert system 86 in the gateway 100 includes an event handling module 88, an action handling module 90, an expert system control module 92 and an expert system inferring engine module 94. The expert system control module 92 includes an action conversion module 92a, a rule conversion module 92b and an event conversion module 92c. The expert system inferring engine module 94 includes a knowledge base 94a and an inferring engine module 94b. Among them, the inferring engine module 94b includes the event message receiving module 22a, the fact record obtaining module 22b, the intention inferring module 22c, the service determination module 22d and the output module 22e mentioned above.

Figure 5A:
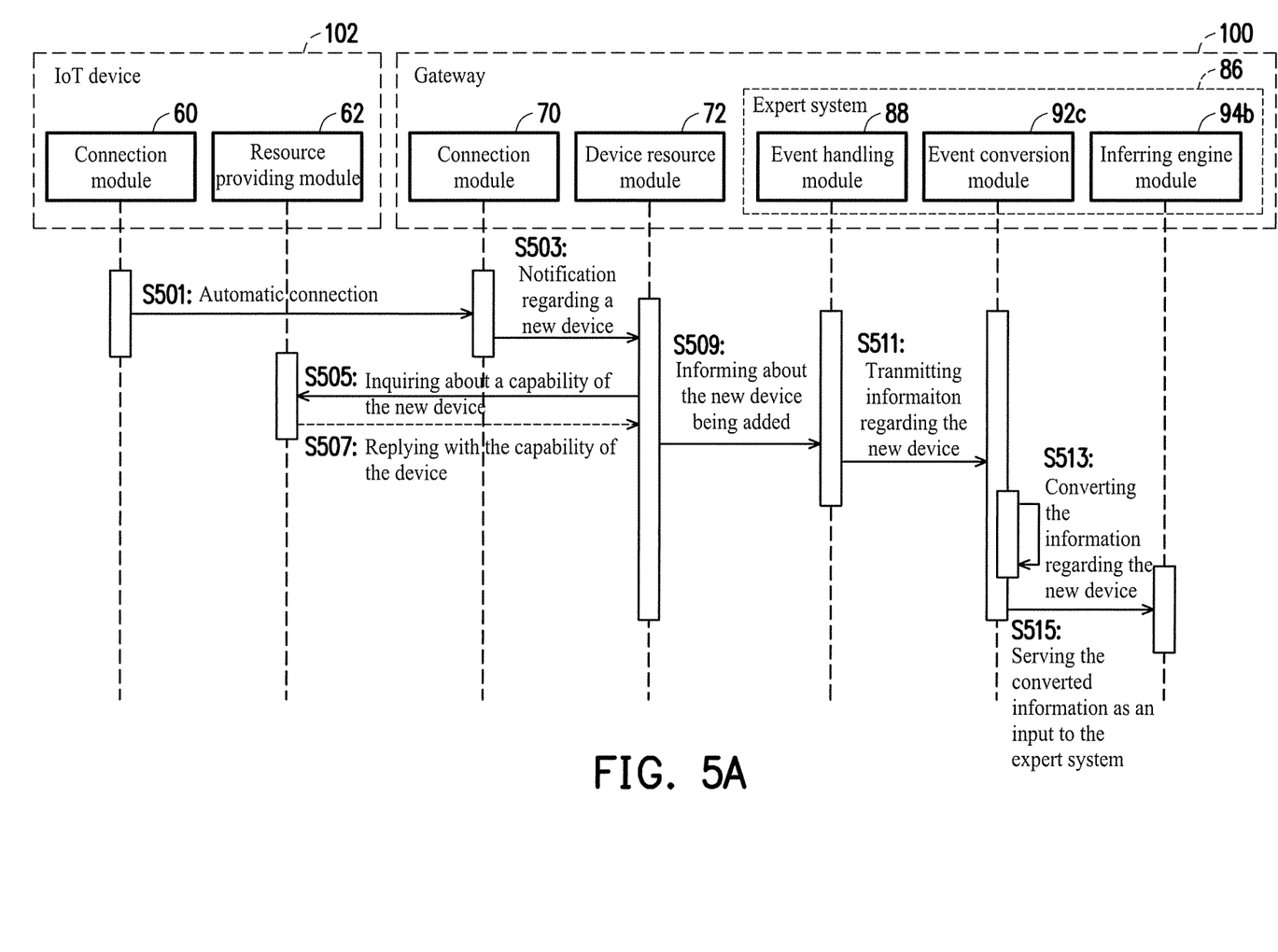
FIG. 5A to FIG. 5C are schematic diagrams illustrating operations of an IoT device control system according to an embodiment of the invention.
Figure 5B:
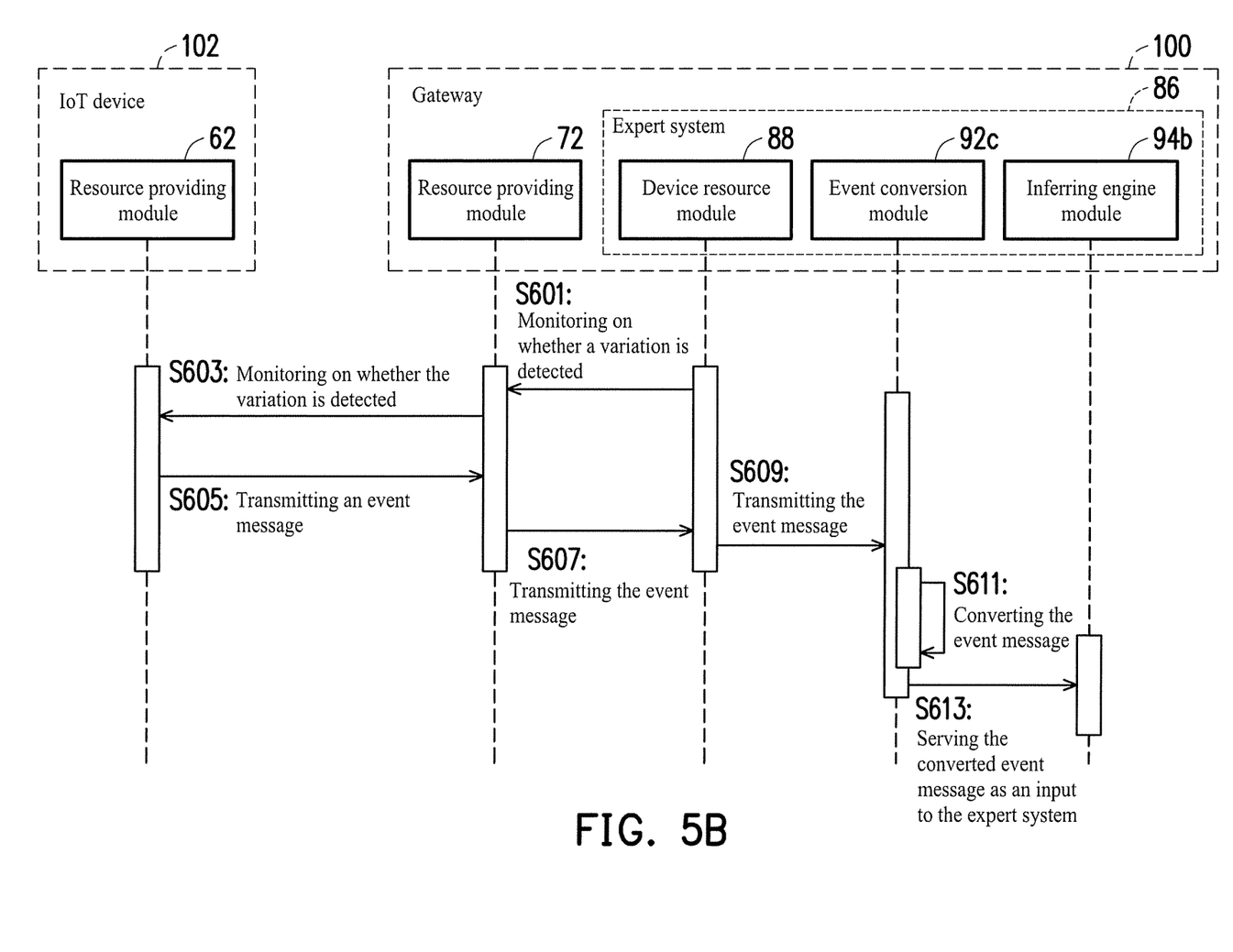
Figure 5C:
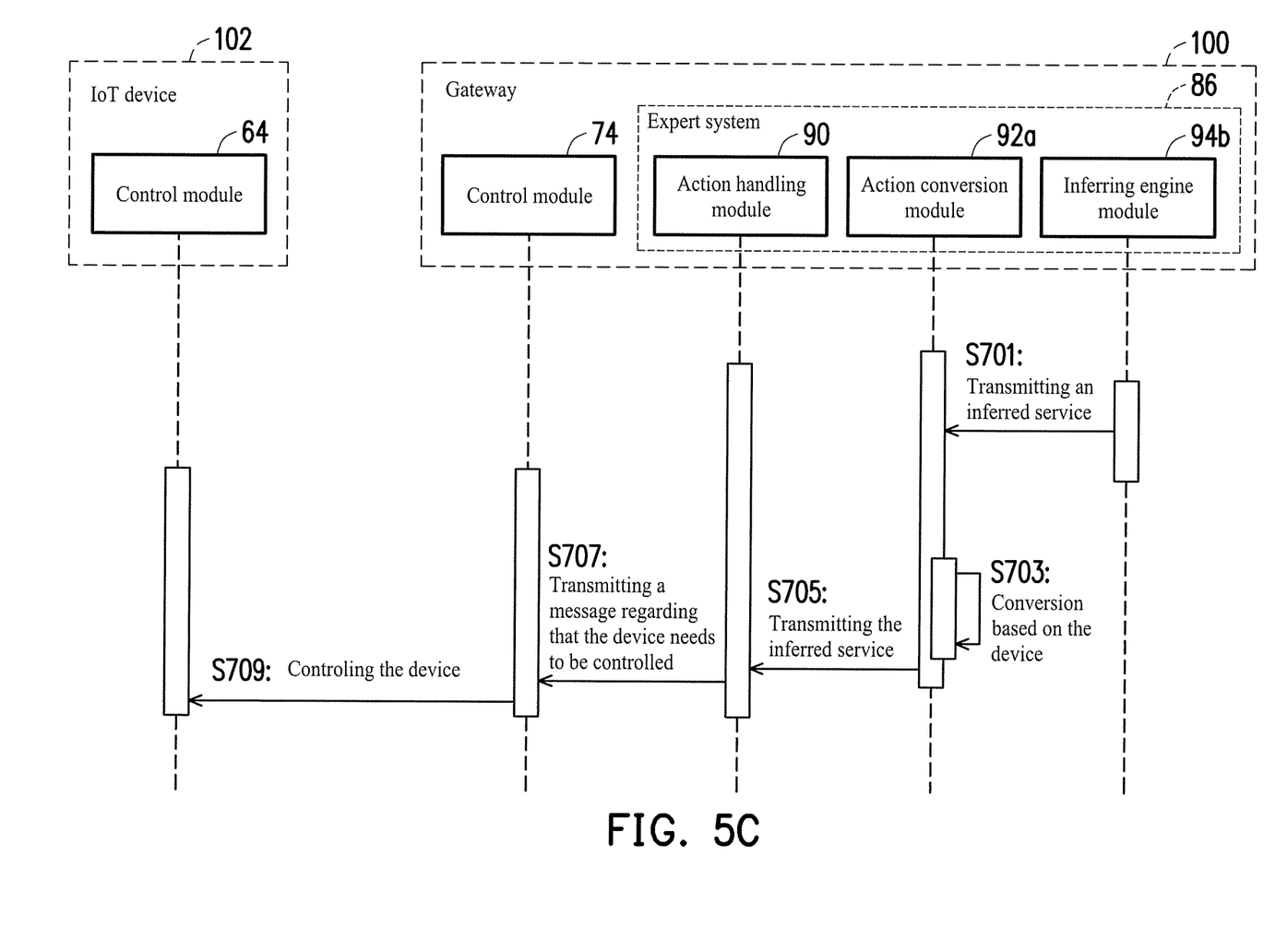

FIG. 5A to FIG. 5C are schematic diagrams illustrating operations of an IoT device control system according to an embodiment of the invention.

Referring to FIG. 4 and FIG. 5A together, when an IoT device or an electronic device is to be added to the IoT device control system 1000 for operation, with the IoT device 102 as an example, in step S501, the connection module 60 of the IoT device 102 can perform an automatic connection with the connection module 70 of the gateway 100. Afterwards, in step S503, the connection module 70 of the gateway 100 can notify the device resource module 72 with a message regarding the new device (i.e., the IoT device 102) being added. In step S505, the device resource module 72 inquires the resource providing module 62 of the IoT device 102 about a capability owned by the IoT device 102. In step S507, the resource providing module 62 of the IoT device 102 can reply the device resource module 72 of the gateway 100 with information regarding the capability owned by the IoT device 102. For instance, if the IoT device 102 is the air conditioning equipment, the capability thereof includes temperature detection and temperature regulation, for example.

Afterwards, in step S509, the device resource module 72 of the gateway 100 transmits information regarding the IoT device 102 to the event handling module 88 in the expert system 86. Such information includes, for example, information regarding the IoT device 102 being added and the capability of the IoT device 102. In step S511, the event handling module 88 transmits the information regarding the IoT device 102 to the event conversion module 92*c*. In step S513, the event conversion module 92*c* converts the information regarding the IoT device 102 into a usable format for the inferring engine module 94*b*. Then, in step S515, the converted information of the IoT device 102 is transmitted to the inferring engine module 94*b* as an input to the expert system 86. For example, the inferring engine module 94*b* can store the capability of the IoT device 102 into the knowledge base 94*a* or the database 84.

Afterwards, referring to FIG. 4 and FIG. 5B together, the gateway 100 can monitor on whether a variation occurred on the external environment is detected by the IoT device 102. In step S601, the event handling module 88 in the expert system 86 transmits a message to the device resource module 72 for requesting the device resource module 72 to monitor on whether the variation of the external environment is detected by the IoT device 102. In step S603, the device resource module 72 monitors on (or inquires about) whether the resource providing module 62 of the IoT device 102 detects the variation on the external environment. When the variation is detected, in step S605, the resource providing module 62 transmits an event message (e.g., temperature information) to the device resource module 72 of the gateway 100. In step S607, the device resource module 72 transmits the event message to the event handling module 88 in the expert system 86. In step S609, the event handling module 88 transmits the event message to the event conversion module 92*c* in the expert system 86. In step S611, the event conversion module 92*c* converts the event message transmitted by the IoT device 102 into the usable format for the inferring engine module 94*b*. Then, in step S613, the converted event message is transmitted to the inferring engine module 94*b* as an input to the expert system 86. In other words, after step S613, the inferring engine module 94*b* in the expert system 86 can use the knowledge base 94*a* to perform the IoT device control method of FIG. 3, so as to infer the service to be provided to the user according to the event message of the IoT device 102.

Afterwards, referring to FIG. 4 and FIG. 5C together, in step S701, when the service to be provided to the user is inferred by the inferring engine module 94*b* according aforementioned method, the inferring engine module 94*b* can transmit information regarding the service to be provided to the user to the action conversion module 92*a*. Afterwards, in step S703, the action conversion module 92*a* converts the information regarding the service to be provided to the user according to a type of the IoT device 102. For example, such information is converted into a control signal that the IoT device 102 can identify. Afterwards, in step S705, the action handling module 90 obtains the inferred service and the corresponding control signal transmitted from the action conversion module 92*a*. In step S707, the action handling module 90 transmits a message obtained from the action conversion module 92*a* to the control module 74, so as to notify the control module 74 with a message regarding that the IoT device 102 needs to be controlled. Afterwards, in step S709, according to the message from the action handling module 90, the control module 74 can send an output message (e.g., the control signal) to the control module 64 of the IoT device 102 for controlling the IoT device 102 to execute a corresponding service or operation.

Particularly, in an embodiment, the control module 74 may also send the output message to the could control module 76 so the cloud control module 76 can provide such output message to the cloud control server 110 for recording the service or the operation to be executed by the IoT device 102. In addition, the user may also control the gateway 100, transmit messages to the gateway 100 or receive messages from the gateway 100 by using the electronic device 104 via the could control server 110. When the user uses the electronic device 104 near the gateway 100, a data transmission with the gateway 100 may be directly conducted by using local area network (LAN). When the user is not near the gateway 100, the electronic device 104 and the gateway 100 may be communicated to each other with the cloud control server 110 as medium via the Internet. For example, the electronic device 104 may also generate the event message through the resource providing module 62 and transmit the event message to the cloud control server 110. Afterwards, the cloud control server 110 can transmit the event message generated by the electronic device 104 to the cloud control module 76 in the gateway 100 via the Internet. Then, the event message generated by the electronic device 104 is forwarded to the device resource module 72 by the cloud control module 76. Lastly, the event message generated by the electronic device 104 is inputted to the event handling module 88 by the device resource module 72 so the subsequent inferring tasks may be performed.

Furthermore, when the user is not near the gateway 100, the electronic device 104 and the gateway 100 may also be communicated to each other with the cloud control server 110 as medium via the Internet, so as to control the related IoT device 102. For example, the electronic device 104 may also generate the control signal through control module 64 and transmit the control signal to the cloud control server 110. Afterwards, the cloud control server 110 can transmit the control signal generated by the electronic device 104 to the cloud control module 76 in the gateway 100 via the Internet. Then, the control signal generated by the electronic device 104 is forwarded to the device resource module 72 by the cloud control module 76. Lastly, the control signal generated by the electronic device 104 is inputted to the event handling module 88 by the device resource module 72 so the subsequent inferring tasks or tasks for controlling the IoT device 102 may be performed.

In an embodiment, the electronic device 104 may also receive messages or notifications from the gateway 100 via the cloud control server 110. For example, the control module 74 of the gateway 110 can transmit a notification message to the cloud control module 76 after completing the inference. Then, the cloud control module 76 can provide the notification message to the cloud control server 110 so the cloud control server 110 can transmit the notification message to the control module 64 of the electronic device 104.

Further, in FIG. 4, the gateway 100 may also receive the event message from the web services server 106. For example, the web services management module 78 of the gateway 100 can receive the event message actively sent by the web services server 106. The web services management module 78 transmits the received event message to the event handling module 88 in the expert system 86. The event handling module 88 transmits the event message to the event conversion module 92c for conversion. Afterwards, the event conversion module 92c inputs the converted event message to the inferring engine module 94b for the inference.

In addition, information in the knowledge base 94a may come from the rule server 108. For example, the rule management module 80 in the gateway 100 may obtain related information (the suitable temperature for human body) from the rule server 108, perform a format conversion on the obtained information through rule conversion module 92b, and store the result into the knowledge base 94a. In addition, the information in the knowledge base 94a may also be generated according to preference information of the user and a machine learning algorithm of the machine learning module 82. For example, the IoT device 102 or the resource providing module 62 of the electronic device 104 can provide the preference information to the device resource module 72 of the gateway 100. In an embodiment, if the user intends to set the temperature of the IoT device 102 (it is assumed to be the air-conditioner herein) to 24° C. by using the electronic device 104 via the gateway 100, the gateway 100 can use such temperature as the preference information of the user. Afterwards, the device resource module 72 can input the preference information of the user into the event conversion module 92c. The event conversion module 92c can convert the preference information (e.g., information regarding the temperature being 24° C.) of the user and store the result into the database 84. Afterwards, the machine learning module 82 can obtain the preference information of the user from the database 84, and use the preference information as an input for executing the machine learning algorithm so as to obtain a rule of the user for using the IoT device 102 or the electronic device 104. Afterwards, the machine learning module 82 transmits the rule obtained from the machine learning algorithm to the rule management module 80. The rule management module 80 performs a format conversion on the obtained rule through the rule conversion module 92b and stores the result into the knowledge base 94a. Afterwards, during the inference, the inferring engine module 94b can refer to the information stored in the knowledge base 94a. For example, later when the user turns on the air-conditioner, the IoT device 102 can provide information regarding the current temperature to the gateway 100 so the gateway 100 can infer the most suitable temperature for the user according to the current temperature and the information in the knowledge base 94a for corresponding adjustments.

In addition, when the user intends to control the IoT device 102 by using the electronic device 104, the user may also use the resource providing module 62 and/or the control module 64 of the electronic device 104 to transmit the control signal to the cloud control server 110. In this case, the cloud control server 110 can transmit a corresponding message to the cloud control module 76 of the gateway 100 according to the control signal. The cloud control module 76 then gives a corresponding instruction to the control module 74. The control module 74 can control the corresponding IoT device 102 to execute a corresponding operation according to the instruction of the cloud control module 76.

In particular, the expert system 86 in the gateway 100 may also be applied in a general electronic device of the user or a general server. Also, a mutual information transmission may also be performed between different expert systems, and details regarding a possible use case of the expert system 86 are described with reference to a scenario provided as follows.

For example, it is assumed that there is a cloud server disposed with an expert system (a.k.a. a cloud expert system). In the scenario where a large number of IoT devices are disposed inside a building, if the IoT device detects a fire disaster, the IoT device can transmit an event message regarding the fire disaster to the cloud expert system. The cloud expert system can activate fire procedures according to the event message regarding the fire disaster. First of all, the cloud expert system notifies the local fire department. Then, intentions of users on floors above a reference floor— where the fire point is started—are classified as survival, whereas intentions of users on floors below the reference floor are classified as escaping. The cloud expert system can pass the classified results to the expert system in the gateway own by each user or the expert system in the electronic device of the user.

For the user classified as escaping (a.k.a. an escape seeker), the expert system in the gateway of each escape seeker (or in the electronic device of each escape seeker) can activate an escape path planning service and infer an optimal path for each escape seeker, and such path will avoid dangerous areas determined by cloud expert system of the cloud server.

For the user classified as survival (a.k.a. a survival seeker), the expert system in the gateway of each survival seeker (or in the electronic device of each survival seeker) can activate a searching service of a location for awaiting rescue and activate a corresponding warning service. In addition, the expert system of the survival seeker can also return information regarding whether there is any suitable location for awaiting rescue, whether there is a path for reaching such location and other warning service messages to rescuers such that the rescuers can be aware of the current status of the survival seeker.

With respect to a rescue commander, the rescue commander may also be the user of said cloud server. The rescue commander is able to watch the current situation of fire distribution through the screen and directly intervene with the cloud expert system. The rescue commander may also use the cloud expert system for transmitting messages to an expert system (a.k.a. a rescue expert system) in the gateway (or the electronic device) used by the rescuer, so as to notify the rescuer regarding a rescue target location.

For the rescuer, other than knowing the rescue target location, an effective rescue path may also be planned through the rescue expert system. In this way, unnecessary waste of time in the fire scene is prevented, and the rescuer is also able to go pass safer areas. Further, the rescue expert system may also notify the survival seeker with information about the rescuer is on the way, plan for an evacuation path after being rescued, and notify the survival seeker the same.

In summary, the invention proposes a gateway, an IoT device control system and an IoT device control method. The gateway of the invention can receive the event message from outside the gateway, and obtain the corresponding fact record according to the event message. According to the fact record, the gateway can infer the intention of the user. According to the inferred intention of the user, the service to be provided to the user may be determined. Lastly, according to the determined service, the corresponding IoT device is controlled to provide the service. In this way, the user does not have to understand how the gateway and the IoT devices are connected and communicated since the gateway can automatically determine the intention of the user and control the corresponding IoT device to provide the corresponding service. As a result, a use experience of the user may be effectively improved when using the IoT device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gateway for Internet of Things (IoT), comprising:
a communication circuit, configured to wirelessly connect with at least one IoT device;
a memory circuit, configured to store a plurality of modules; and
a processor, coupled to the communication circuit and the memory circuit, and configured to control operations of the communication circuit and access the memory circuit for executing the modules, wherein the modules comprise:
an event message receiving module, receiving an event message;
a fact record obtaining module, obtaining a first fact record corresponding to the event message according to the event message;
an intention inferring module, automatically inferring an intention corresponding to a user according to the first fact record without an input from the user, wherein the intention corresponding to the user indicates at least one operation which is going to be performed by the user;
a service determination module, determining a service to be provided to the user according to the intention corresponding to the user, wherein the determined service corresponds to the at least one operation; and
an output module, outputting an output message to a first IoT device in the at least one IoT device according to the determined service such that the first IoT device provides the service according to the output message.

2. The gateway for IoT according to claim 1, wherein in the operation of receiving the event message,
the event message receiving module receives the event message sent by a second IoT device in the at least one IoT device,
wherein the event message is obtained by sensing an external environment by the second IoT device.

3. The gateway for IoT according to claim 1, wherein in the operation of receiving the event message,
the event message receiving module receives the event message sent by a web services server.

4. The gateway for IoT according to claim 1, wherein
the memory circuit stores a second fact record before the operation of obtaining the first fact record corresponding to the event message according to the event message, and
in the operation of obtaining the first fact record corresponding to the event message according to the event message, the fact record obtaining module obtains the first fact record according to the event message and the second fact record.

5. The gateway for IoT according to claim 4, wherein in the operation of obtaining the first fact record according to the event message and the second fact record,
the fact record obtaining module obtains the first fact record according to the event message, the second fact record, and additional information obtained from a first electronic device.

6. The gateway for IoT according to claim 1, wherein the memory circuit is further configured to store a knowledge base, and
in the operation of inferring the intention corresponding to the user according to the first fact record, the intention inferring module infers the intention corresponding to the user according to the first fact record and information in the knowledge base.

7. The gateway for IoT according to claim 6, wherein the information in the knowledge base is generated according to preference information of the user and a machine learning algorithm, and the preference of the user is obtained from a second electronic device of the user.

8. The gateway for IoT according to claim 6, wherein the information in the knowledge base comes from a rule server.

9. The gateway for IoT according to claim 1, wherein the intention inferring module receives the intention of the user sent from a third electronic device.

10. The gateway for IoT according to claim 1, wherein in the operation of outputting the output message to the first IoT device in the at least one IoT device according to the service such that the first IoT device provides the service according to the output message,
the output module outputs the output message to the first IoT device such that the first IoT device executes an operation corresponding to the service or displays a content corresponding to the service.

11. An Internet of Things (IoT) control system, comprising:
at least one IoT device; and
a gateway, wherein
the gateway receives an event message from outside the gateway,
the gateway obtains a first fact record corresponding to the event message according to the event message,
the gateway automatically infers an intention corresponding to a user according to the first fact record without an input from the user, wherein the intention corresponding to the user indicates at least one operation which is going to be performed by the user,
the gateway determines a service to be provided to the user according to the intention corresponding to the user, wherein the determined service corresponds to the at least one operation, and
the gateway outputs an output message to a first IoT device in the at least one IoT device according to the determined service such that the first IoT device provides the service according to the output message.

12. The IoT control system according to claim 11, wherein in the operation of receiving the event message from outside the gateway,
the gateway receives the event message sent by a second IoT device in the at least one IoT device,
wherein the event message is obtained by sensing an external environment by the second IoT device.

13. The IoT control system according to claim 11, further comprising:
a web services server, wherein in the operation of receiving the event message from outside the gateway,
the gateway receives the event message sent by a web services server.

14. The IoT control system according to claim 11, wherein the gateway stores a second fact record before the operation of obtaining the first fact record corresponding to the event message according to the event message, and
in the operation of obtaining the first fact record corresponding to the event message according to the event message, the gateway obtains the first fact record according to the event message and the second fact record.

15. The IoT control system according to claim 14, further comprising:
a first electronic device, wherein in the operation of obtaining the first fact record according to the event message and the second fact record,
the gateway obtains the first fact record according to the event message, the second fact record, and additional information obtained from the first electronic device.

16. The IoT control system according to claim 11, wherein the gateway is further configured to store a knowledge base, and
in the operation of inferring the intention corresponding to the user according to the first fact record, the gateway infers the intention corresponding to the user according to the first fact record and information in the knowledge base.

17. The IoT control system according to claim 16, further comprising:
a second electronic device, wherein the information in the knowledge base is generated according to preference information of the user and a machine learning algorithm, and the preference information of the user is obtained from the second electronic device of the user.

18. The IoT control system according to claim 16, further comprising:
a rule server, wherein the information in the knowledge base comes from the rule server.

19. The IoT control system according to claim 11, further comprising:
a third electronic device, wherein the gateway receives the intention of the user sent from the third electronic device.

20. The IoT control system according to claim 11, wherein in the operation of outputting the output message to the first IoT device in the at least one IoT device according to the determined service such that the first IoT device provides the service according to the output message,
the gateway outputs the output message to the first IoT device such that the first IoT device executes an operation corresponding to the service or displays a content corresponding to the service.

21. An Internet of Things (IoT) control method, comprising:
receiving an event message;
obtaining a first fact record corresponding to the event message according to the event message;
automatically inferring an intention corresponding to a user according to the first fact record without an input from the user, wherein the intention corresponding to the user indicates at least one operation which is going to be performed by the user;
determining a service to be provided to the user according to the intention corresponding to the user, wherein the determined service corresponds to the at least one operation; and
outputting an output message to a first IoT device in at least one IoT device according to the service such that the first IoT device provides the service according to the output message.

22. The IoT control method according to claim 21, wherein the step of receiving the event message comprises:
receiving the event message sent by a second IoT device in the at least one IoT device,
wherein the event message is obtained by sensing an external environment by the second IoT device.

23. The IoT control method according to claim 21, wherein the step of receiving the event message comprises:
receiving the event message sent by a web services server.

24. The IoT control method according to claim 21, wherein before the step of obtaining the first fact record corresponding to the event message according to the event message, the IoT control method further comprises:
storing a second fact record, wherein the step of obtaining the first fact record corresponding to the event message according to the event message comprise:
obtaining the first fact record according to the event message and the second fact record.

25. The IoT control method according to claim 24, wherein the step of obtaining the first fact record according to the event message and the second fact record comprises:
obtaining the first fact record according to the event message, the second fact record, and additional information obtained from a first electronic device.

26. The IoT control method according to claim 21, further comprising:
storing a knowledge base, wherein the step of inferring the intention corresponding to the user according to the first fact record comprises:
inferring the intention corresponding to the user according to the first fact record and information in the knowledge base.

27. The IoT control method according to claim 26, wherein the information in the knowledge base is generated according to preference information of the user and a machine learning algorithm, and the preference information of the user is obtained from a second electronic device of the user.

28. The IoT control method according to claim 26, wherein the information in the knowledge base comes from a rule server.

29. The IoT control method according to claim 21, further comprising:
receiving the intention of the user sent from a third electronic device.

30. The IoT control method according to claim 21, wherein the step of outputting the output message to the first IoT device in the at least one IoT device according to the service such that the first IoT device provides the service according to the output message comprises:

outputting the output message to the first IoT device such that the first IoT device executes an operation corresponding to the service or displays a content corresponding to the service.

\* \* \* \* \*